United States Patent [19]
Ishijima

[11] 3,806,726
[45] Apr. 23, 1974

[54] APPARATUS FOR X-RAY ANALYSIS
[75] Inventor: Hiroshi Ishijima, Tokyo, Japan
[73] Assignee: Nihon Denshi Kabushiki Kaisha, Tokyo, Japan
[22] Filed: Aug. 30, 1972
[21] Appl. No.: 285,058

[30] Foreign Application Priority Data
Sept. 7, 1971   Japan.............................. 46-69069

[52] U.S. Cl. ............................... 250/277, 250/273
[51] Int. Cl. .......................................... G01n 23/20
[58] Field of Search .................... 250/49.5 PE, 51.5

[56] References Cited
UNITED STATES PATENTS
3,119,013   1/1964   Wytzes et al. ..................... 250/51.5
2,837,655   6/1958   Lang ................................. 250/51.5

Primary Examiner—William F. Lindquist
Attorney, Agent, or Firm—Webb, Burden, Robinson & Webb

[57] ABSTRACT

This specification discloses an apparatus for X-ray analysis having a pulse height analyzer. A high voltage supplied to an X-ray counter, such as a proportional or scintillation counter, is varied according to the rotation of the goniometer, whereby the mean pulse height of the output pulses of the counter attributable to the X-rays satisfying the Bragg equation are maintained substantially constant.

2 Claims, 3 Drawing Figures

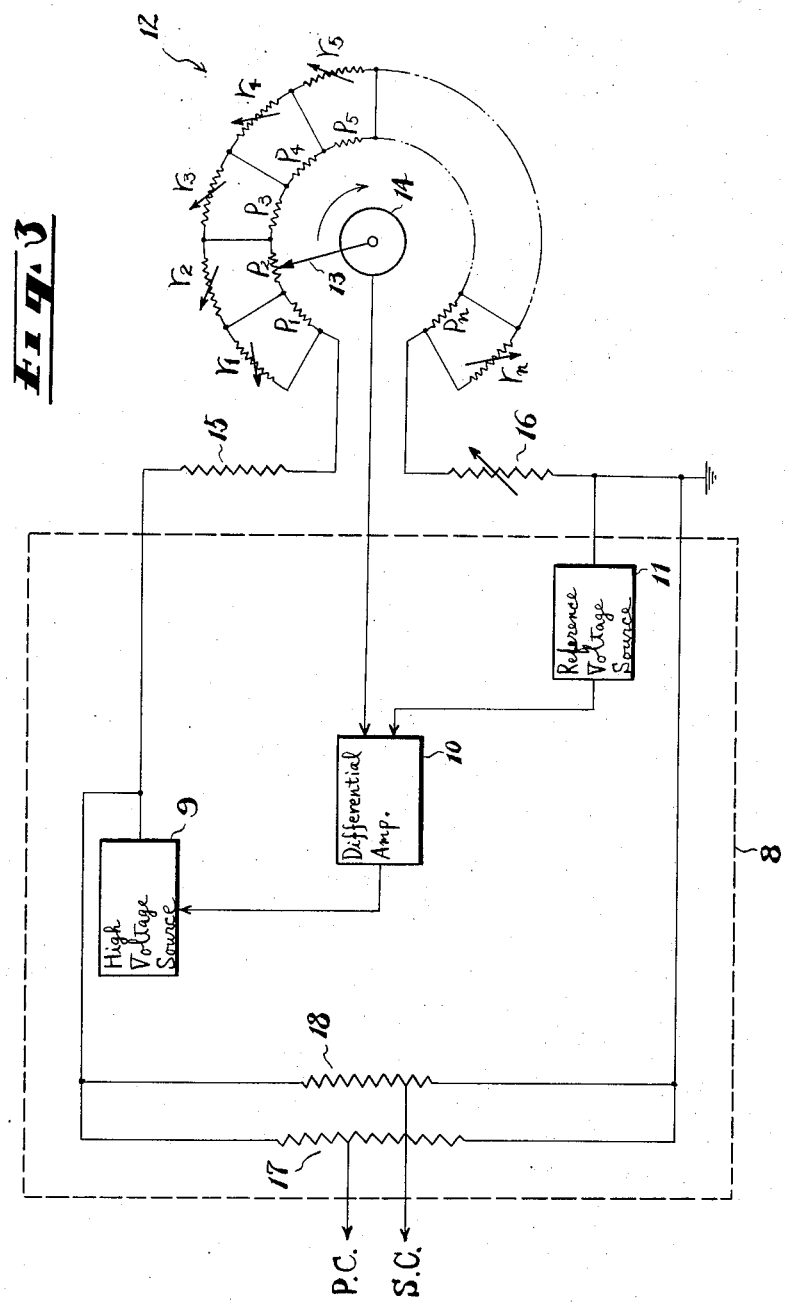

APPARATUS FOR X-RAY ANALYSIS

This invention relates in general to an apparatus for X-ray analysis, and more particularly, it relates to an apparatus of said type using a pulse height analyzer.

In an apparatus for X-ray analysis, for example, X-ray fluorescent analysis, X-rays radiated from a sample are diffracted by a single crystal according to the wavelength of the respective X-rays and reflected accordingly. Those X-rays reflected from the single crystal at an angle of $2\theta$ enter an X-ray counter such as a proportional or scintillation counter and are converted into pulses whose heights are proportional to the energy of the X-rays entering the counter. The output pulse height of the counter is adjusted by a linear amplifier so that the pulse height of the X-rays having a wavelength satisfying the Bragg equation remains constant even when the goniometer comprising the single crystal and the counter is rotated. The output pulses of the linear amplifier are fed into a pulse height analyzer in order to eliminate noise components such as stray X-rays and second and third order reflections.

In the above apparatus, however, the voltage applied to the counter is fixed. Further, in order for the counter to be able to detect low energy X-rays, said voltage must be comparatively high. As a consequence, when high energy X-rays are detected, the intensity of the noise components included in the detected signal is high, since high energy X-rays only require a comparatively small voltage for detection purposes.

Furthermore, when using a proportional counter, if the counting rate of the incident X-rays increases during high energy X-ray detection, the number of gas ions in the counter is proportionally increased. And, if these respective increases are large, the excess gas ions group to form an ion sheath around the counter anode which results in a decrease in the pulse height of the output pulses. Consequently, if this occurs, the proportional relationship between the energy of the incident X-rays and the output pulse height of the counter is destroyed.

Briefly, in the apparatus for X-ray analysis according to this invention, a portion of the X-rays diffracted by a crystal monochromator enter an X-ray counter. The voltage applied to the counter is varied according to the rotation of the counter and in accordance with the energy level of the X-rays.

The X-rays entering the counter are converted into electrical pulses, the mean pulse height of the pulses corresponding to the X-rays satisfying the Bragg equation remaining constant even if the goniometer is rotated. The output pulses from the counter are then supplied to a pulse height analyzer in order to eliminate the noise components.

In the above apparatus, since the voltage applied to the counter is varied by the rotation of the counter in accordance with the energy level of the X-rays, an appropriate detecting voltage is applied at all times. Thus, when high energy X-rays enter the counter, the applied voltage is correspondingly low thereby eliminating the noise components included in the output pulses. For the same reason, when using a proportional counter, the number of gas ion is kept from increasing and the formation of an ion sheath around the counter anode is prevented even if the increase in the counting rate of the incident X-rays is large.

One object of this invention is to provide an apparatus for X-ray analysis having a high SN ratio.

Another object of this invention is to provide an apparatus for X-ray analysis in which the voltage applied to the X-ray counter is varied according to the rotation of the goniometer.

Other objects and advantages of this invention will become readily apparent by reading the following detailed description in conjunction with the accompanying drawings in which, FIG. 1 shows an apparatus for X-ray analysis according to this invention.

FIG. 3 shows a circuit for controlling the voltage applied to the X-ray counter.

Figure 1:
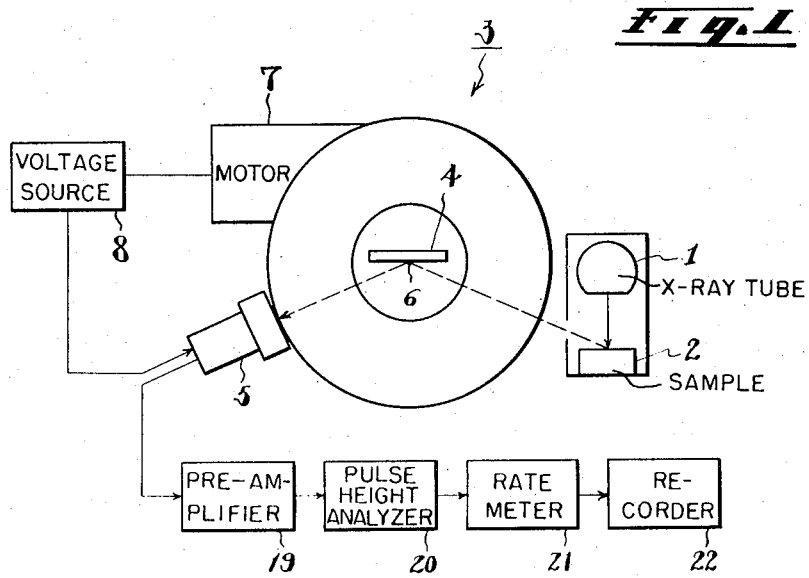

Referring now to FIG. 1, X-rays generated by an X-ray generating tube 1 irradiate a sample 2 so as to radiate fluorescent X-rays from said sample. A portion of the fluorescent X-rays thus radiated enter a goniometer 3 comprising a rotatable crystal monochromator 4 and a rotatable X-ray counter 5 such as a proportional or scintillation counter. The monochromator 4 and the counter 5 are rotated about an axis 6 by a goniometer driving device 7. The rotational speed of the counter is twice that of the monochromator. The fluorescent X-rays are diffracted by the monochromator and those X-rays having a wavelength satisfying the Bragg equation enter the counter. In this way, X-rays with different wavelengths enter the counter in sequence in accordance with the rotation of the goniometer.

Figure 2:
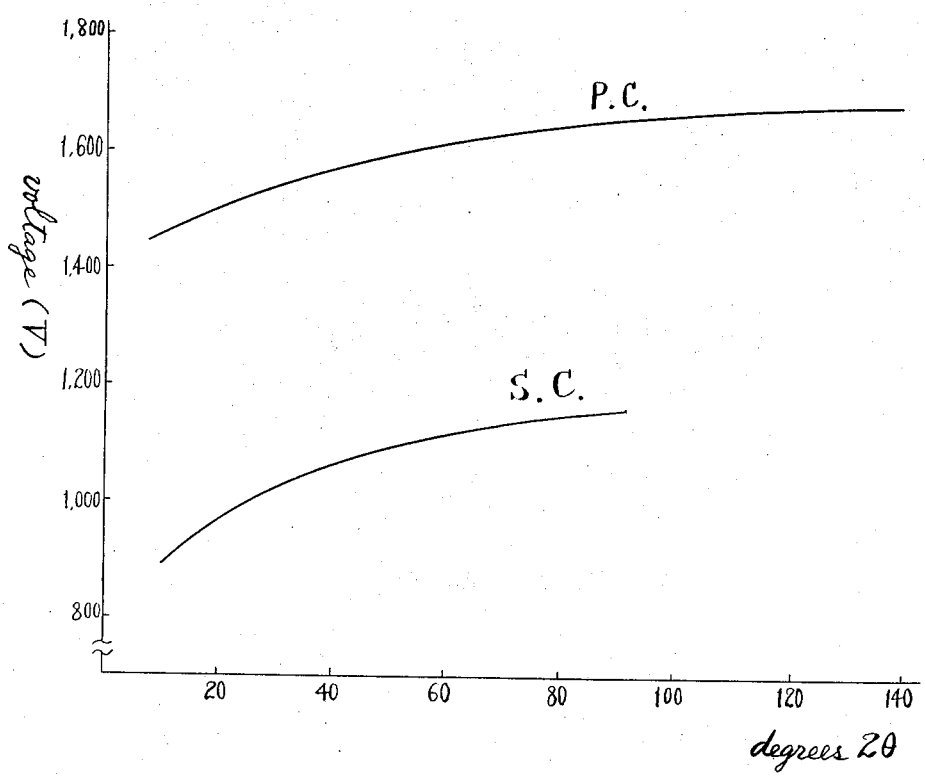
FIG. 2 shows the relationship between the goniometer rotation angle and the voltage applied to the X-ray counter.

The X-rays entering the counter 5 are converted into pulses whose height is adjusted by a voltage supplied to the counter from a variable power source 8 so that the mean pulse height of the pulses, according to the X-rays satisfying the Bragg equation, remains constant. The voltage supplied to the counter 5 from the source 8 is varied by a reference voltage determined by a potentiometer in the goniometer driving device 7. In FIG. 2 showing the relationship between the goniometer rotation angle 20 and the voltage applied to the X-ray counter, P.C. represents the required proportional counter supply voltage curve and S.C. represents the scintillation counter supply voltage curve.

Referring now to the X-ray counter voltage control circuit shown in FIG. 3, the variable power source 8 comprises a high voltage source 9, a differential amplifier 10 and a reference voltage source 11. A potentiometer 12 comprises fixed resistors $P_1 \sim P_n$ and variable resistors $r_1 \sim r_n$. Resistors $P_1 \sim P_n$ are connected in series and resistors $r_1 \sim r_n$ are connected in series. Resistors $P_1$ and $r_1$ ... $P_n$ and $r_n$ are connected in parallel. Hence, the voltage drop across any resistance $P_1$ ... $P_n$ can be varied by adjusting the corresponding resistor $r_1$ ... $r_n$. A brush 13 rotated by an X-ray counter driving axis 14 taps the resistors $P_1$ ... $P_n$. Resistances 15 and 16 are regulating resistances. The output voltage from the potentiometer 12 together with the output from the reference voltage source 11 are fed into the differential amplifier 10, differentiated and fed into the high voltage source 9. Now, since the potentiometer output is obviously varied by the rotation of the brush 13 and since the variation is made approximately proportional to the curves shown in FIG. 2 by adjustment of resistors $r_1$ ... $r_n$, the differential voltage constituting the output of the differential amplifier 10 is also varied by the rotation of the goniometer, said output also being proportional to the curves shown in FIG. 2. Further, this proportionally varying output is applied to the high voltage source 9, thereby controlling said high voltage source accordingly. Since the output of said source is supplied to the proportional counter (PC) and the scintillation counter (SC) via voltage dividers 17 and 18, said voltage applied to said counters varies as shown by the respective curves in FIG. 2 in accordance with the rotation of the goniometer.

The pulses converted by the counter 5 are amplified by a pre-amplifier 19 (see FIG. 1) and supplied to a pulse height analyzer 20. Taking the mean pulse height (voltage) according to the X-rays satisfying the Bragg equation as the median voltage, the window width of the pulse height analyzer 20 is set in order to select the pulses according to the X-rays satisfying the Bragg equation. The output pulses of the analyser 20 are then counted by a rate meter 21 and recorded by a recorder 22.

Having thus described the invention with the detail and particularity as required by the Patent Laws, what is desired protected by Letters Patent is set forth in the following claims.

What is claimed is:

1. An apparatus for X-ray analysis comprising:
A. a crystal monochromator for diffracting X-rays radiated from a sample,
B. an X-ray counter for converting the diffracted X-rays into pulses whose height corresponds to the wavelength of the X-rays entering said counter,
C. means for rotating said crystal monochromator and said X-ray counter about a common axis, the rotation speed of said crystal monochromator being one-half the speed of said X-ray counter,
D. a variable power source for supplying a high voltage to said counter, said high voltage being varied according to the rotation of said crystal monochromator and said X-ray counter, so as to maintain the output means pulse height of the counter constant regardless of the variation in the incident X-rays satisfying the Bragg equation, and
E. a pulse height analyzer for analyzing the output pulses of said counter.

2. An apparatus for X-ray analysis comprising:
A. a crystal monochromator for diffracting X-rays radiated from a sample,
B. an X-ray counter for converting the diffracted X-rays into pulses whose height corresponds to the wavelength of the X-rays entering said counter,
C. means for rotating said crystal monochromator and said X-ray counter about a common axis, the rotation speed of said crystal monochromator being one-half the speed of said X-ray counter,
D. a potentiometer whose output voltage is varied according to the rotation of said crystal monochromator and said X-ray counter,
E. a variable power source for supplying a high voltage to said counter, said high voltage being controlled by the output voltage of said potentiometer in order to maintain the output mean pulse height of the counter constant regardless of the variation in the incident X-rays satisfying the Bragg equation, and
F. a pulse height analyzer for analyzing the output pulses of said counter.

* * * * *